United States Patent [19]

Mojden

[11] 4,000,709

[45] Jan. 4, 1977

[54] CAROUSEL CAN END FEED UNIT

[75] Inventor: Wallace W. Mojden, Hinsdale, Ill.

[73] Assignee: Fleetwood Systems, Inc., Countryside, Ill.

[22] Filed: July 3, 1975

[21] Appl. No.: 593,030

[52] U.S. Cl. .......................... 113/114 BG; 221/11; 221/104; 221/197

[51] Int. Cl.[2] ........................................ B21D 43/12

[58] Field of Search ......... 29/208 R, 208 B, 208 E, 29/208 F; 113/114 R, 114 BG, 114 B, 114 BA; 221/11, 14, 104, 106, 197

[56] References Cited

UNITED STATES PATENTS

| | | | |
|---|---|---|---|
| 1,609,244 | 11/1926 | Goodyear et al. | 221/14 X |
| 2,571,283 | 10/1951 | Nicholson | 221/104 X |
| 3,077,287 | 2/1963 | White | 221/11 X |
| 3,688,946 | 9/1972 | Graham | 221/11 |
| 3,690,327 | 9/1972 | Heitmann | 29/208 C X |
| 3,722,741 | 3/1973 | Mojden | 221/11 |

*Primary Examiner*—Victor A. DiPalma
*Attorney, Agent, or Firm*—Olson, Trexler, Wolters, Bushnell & Fosse, Ltd.

[57] ABSTRACT

An improved carousel-type can end infeed unit is provided. Can end stacks are supported within carrier members and are indexed to a position adjacent a transfer station for ejectment into a processing unit intake. The carrier members are attached to upper and lower multi-link roller chains through extension members and axially elongated roller chain link pins. A single roller mounted to the bottom of each carrier member permits the weight of the carrier member and any can end stack to be supported directly by the apparatus frame, while the carrier member can be moved easily about the apparatus by the roller chains.

4 Claims, 5 Drawing Figures

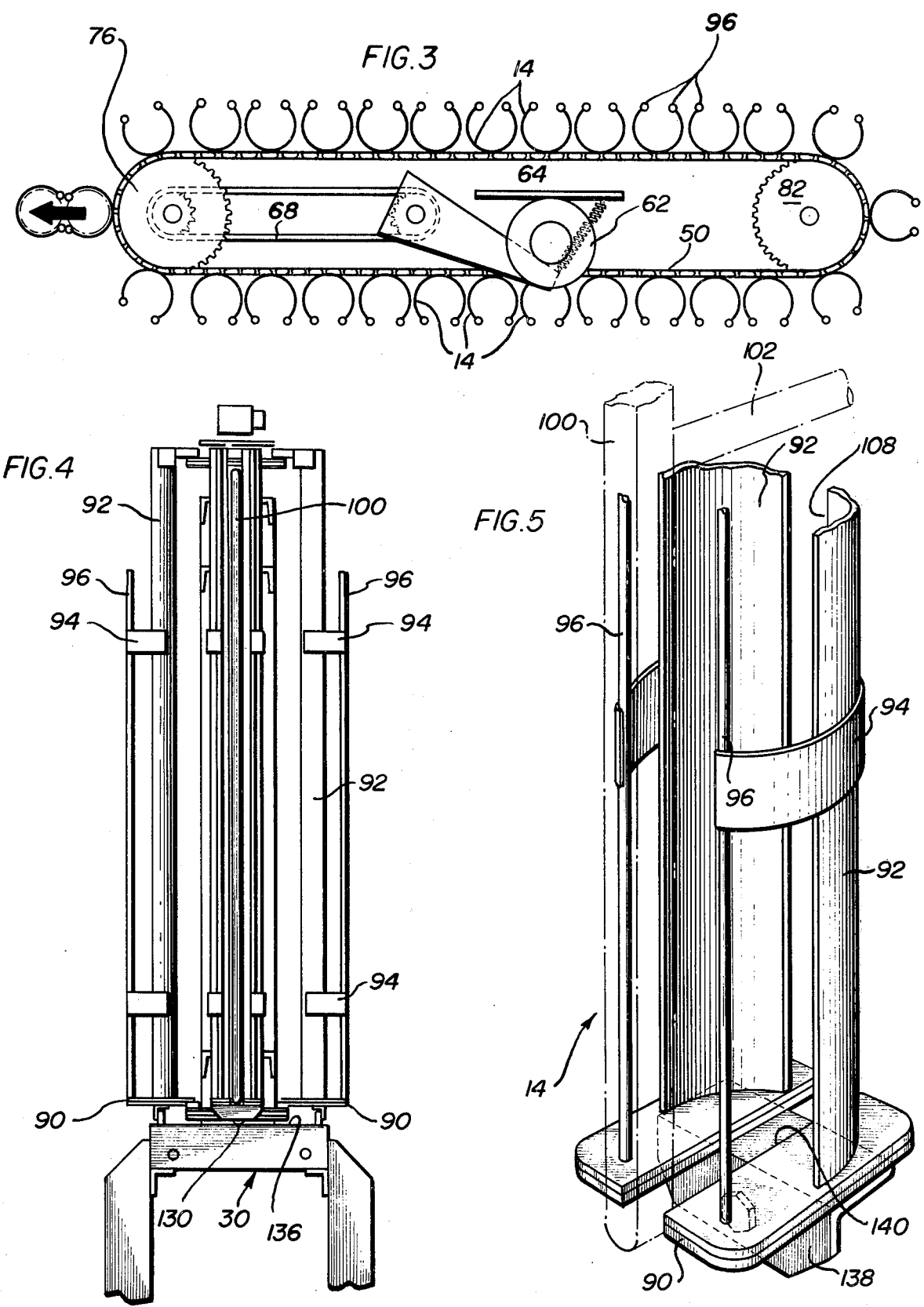

CAROUSEL CAN END FEED UNIT

BACKGROUND OF THE INVENTION

This invention relates generally to apparatus for providing a continuous supply of can ends to a can fabricating or processing line.

Modern can fabricating, processing and manufacturing equipment operates at relatively high rates of speed in order to attain commercially economical production costs. To fabricate or otherwise process cans at these high rates of speed, can end parts must be fed to the fabricating or processing equipment in a uniform manner and at correspondingly high rates of speed from an effectively endless supply. To eliminate continuous supervision and attention by an employee, apparatus such as that described and claimed in U.S. Pat. No. 3,722,741 has been found commercially attractive. In general terms, this can end infeed unit provides a number of can end carrier members, each capable of receiving and storing a stack of can ends. These can ends stacks can be supplied to the indexing unit carrier members manually, as by a single employee who attends and services a plurality of can processing lines and can end infeed units. The carrier members, filled with can ends, are indexed to a transfer station, where ejector mechanisms transfer each can end stack through a transfer station to the intake structure of a can end processing machine. The present invention involves improvements over the apparatus as shown in said prior patent.

DESCRIPTION OF THE DRAWINGS

FIG. 3 is a top plan view, showing in somewhat schematic detail, the top portions of the novel device;

FIG. 4 is an elevational view of the unit, taken substantially in the plane of line 4—4 in FIG. 1; and FIG. 5 is a fragmentary perspective view showing in yet further detail the association of a typical can end stack carrier member and ejector mechanism.

DETAILED DESCRIPTION

Figure 1:
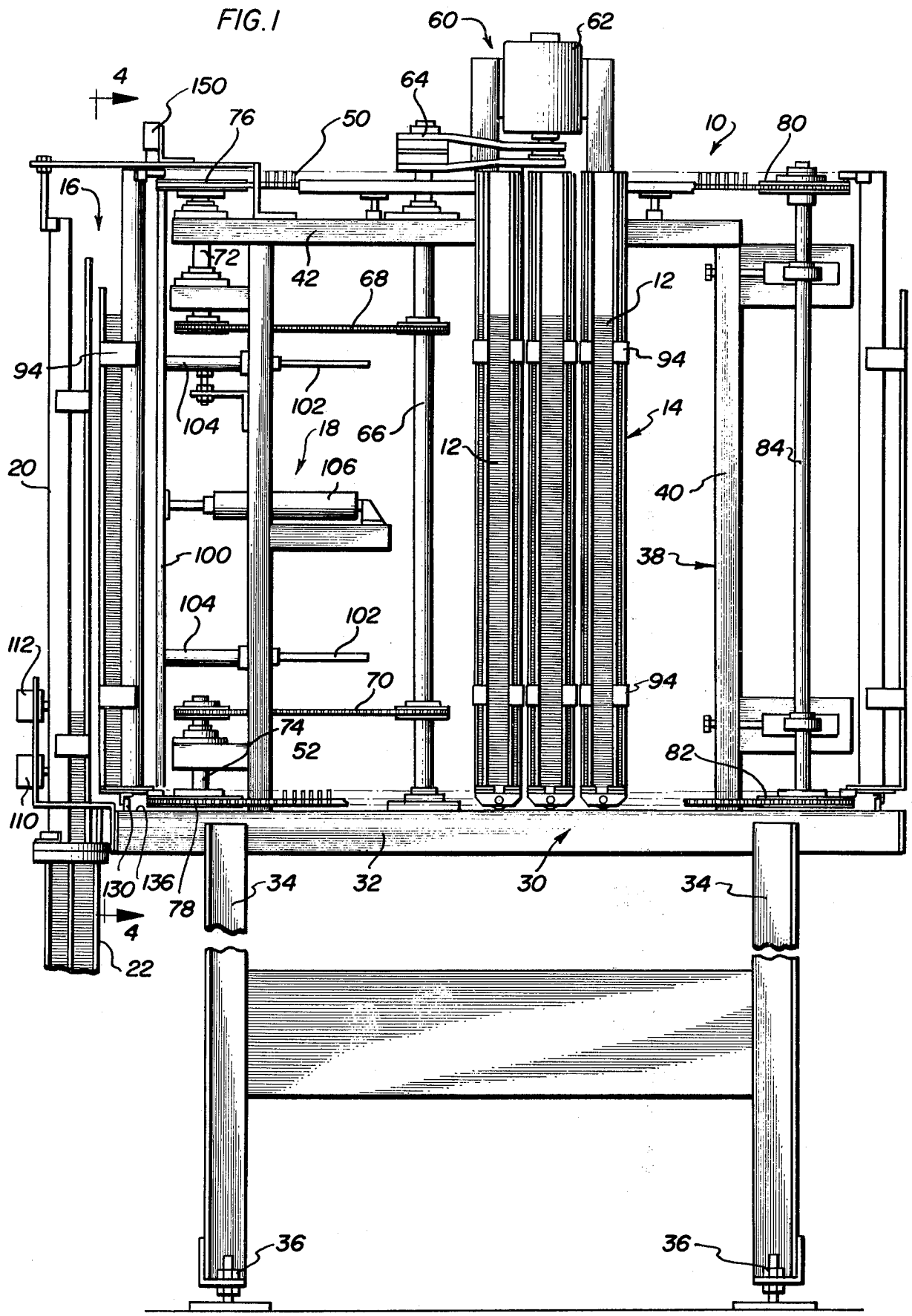
FIG. 1 is an elevational view showing the novel improved carousel infeed unit for can ends.
Figure 2:
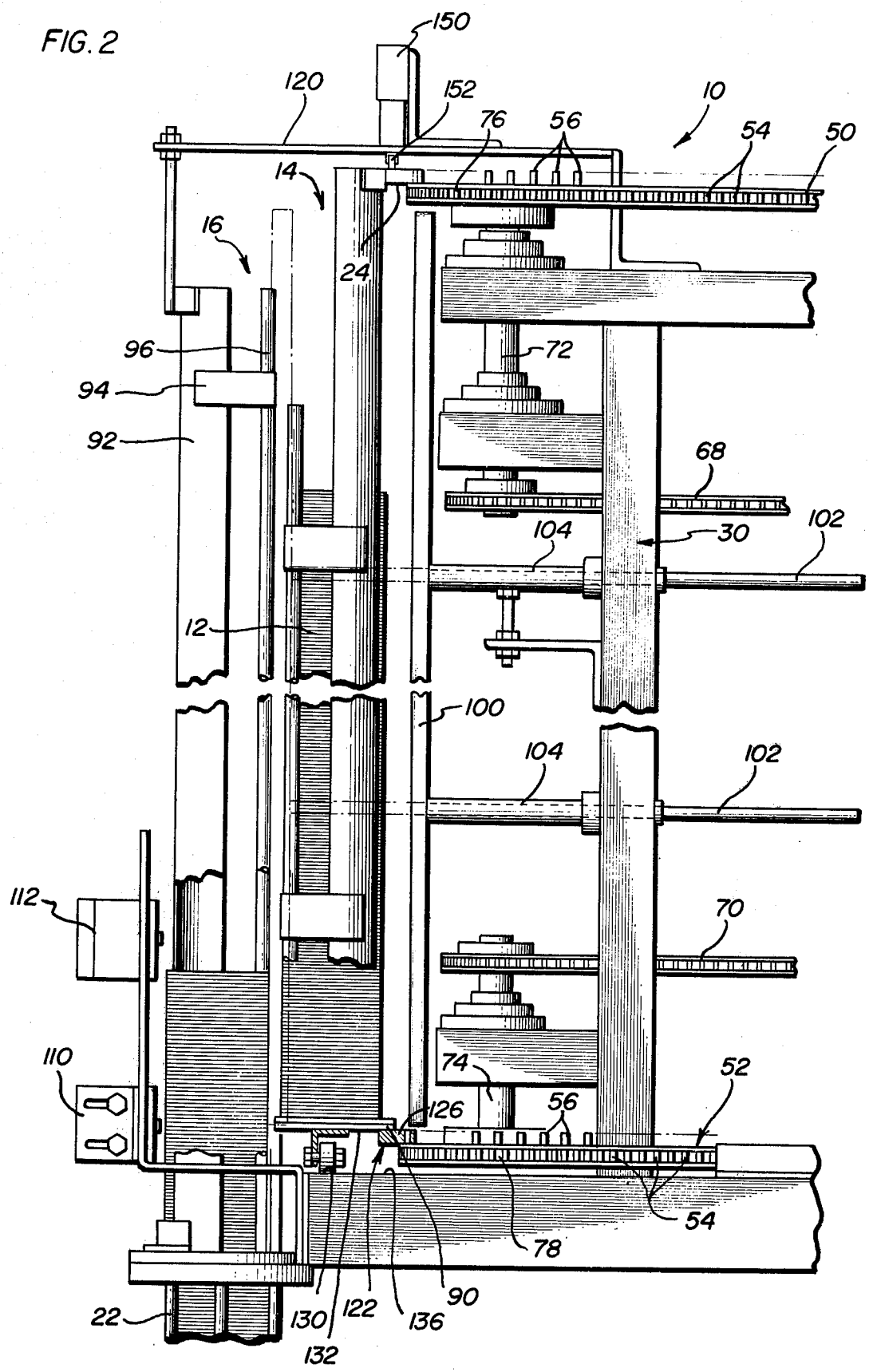
FIG. 2 is an enlarged fragmentary elevational view of a portion of the unit shown in FIG. 1.

Referring in further detail to FIGS. 1, 2 and 4, there is illustrated a carousel-type can end infeed unit 10, constructed in accordance with the present invention. In general terms, this machine receives and stores stacks 12 of can ends in carrier members 14. On demand, these filled carrier members 14 are indexed to a transfer station 16 where the can end stacks 12 are forced out of the carrier members 14 as by an ejector mechanism 18 and into a receiving unit 20. This receiving unit 20 is in operable communication with and guides the can end stacks 12 to intake apparatus 22 of a can end processing unit (not shown).

More particularly, the unit 10 includes a frame 30 comprising a tabletop-like member 32 supported at an elevated position as by appropriate legs 34 which can be adjusted into a level position by leg extenders 36. Above the tabletop member 32 is a superstructure 38 including uprights 40 and cross members 42 for supporting various bearings and other apparatus described below.

Mounted for cyclic motion on the frame 38 are endless upper and lower multi-length roller chains 50 and 52, respectively. Each of these chains contains a number of individual links 54 attached to adjacent links by interconnector pins 56 of extended axial dimension.

To operate these chains 50 and 52, a drive mechanism 60 includes an electric motor 62 or other convenient source of motor power which is connected by a suitable power transmission assembly 64 to a drive shaft 66, as shown in FIG. 3 and elsewhere. Transfer roller chains 68 and 70 deliver motor power to stub shafts 72 and 74, which, in turn, rotate roller chain drive sprockets 76 and 78. As explained above, suitable bearings mount these shafts 66, 72 and 74 for rotation upon the frame 30. At the opposite end of the machine 10, idler sprocket wheels 80 and 82 maintain the respective roller chains 50 and 52 in tensioned and aligned positions; an interconnecting idler shaft 84 assists in providing coincident motion to both upper and lower chains 50 and 52.

The carrier members 14 which are moved by the chains 50 and 52 include a base plate 90 for directly supporting the stacks 12 of the can ends, and relatively rigid back stack supports 92 which abutively restrain toppling motion of each can end stack. Projecting from these rear supports 92 at spaced intervals are resilient leaf spring members 94 which project forward in a stack surrounding manner to carry at their free ends elongate members 96. These elongate members 96 also inhibit unwanted toppling motion of the can end stack. By spreading apart these elongate members 96, a stack of can ends can be inserted into the carrier member 14.

When a carrier member 14 has been moved to the transfer station 16, the stack 12 of can ends is forceably ejected from the carrier member 14 and pushed into the transfer station 16 by an ejector mechanism. Here this mechanism comprises an ejector or pusher bar 100 mounted for reciprocation, as by convenient rods 102 slidable within bearings 104, which are secured, in turn, upon the frame 30. When a convenient hydraulic cylinder 106 or other suitable power device is actuated, the ejector rod 100 is urged forward through an aperture 108 between the separated back stack supports 92, and pushes the can end stack 12 against the elongated members 96. Since these elongate members 96 are mounted for resilient motion toward and away from one another by the resilient leaf springs 94, the elongate members 96 separate, and the can end stack 12 is further pushed into the receiving station 16. In the illustrated embodiment, this receiving station 16 includes vertical stack supports 92, resilient members 94 and elongate rods 96 which are similar to those comprising the carrier member 14. Upon appropriate reverse acutation of the power cylinder 18, the pusher bar 100 is retracted from its extended position within or through the carrier member aperture 108 into the position illustrated in FIG. 1.

When the ejector bar 100 is thus withdrawn from an interfering position within the carrier member 14, the carrier member is free to be indexed out of the receiving station 16. Appropriate sensors 110 and 112 are mounted at the lower end of the receiving station 16 to provide appropriate electrical or other signals to the apparatus when stack of can lids in the receiving station 16 diminishes. These sensor signals can be used to actuate the drive motor 62 and index another, filled, carrier member 14 containing another stack of can ends into position adjacent the receiving station 16 where the cycle of operation is repeated. When this cycle is performed with sufficient rapidity, the supply of can ends in the processing unit intake 22 is never exhausted.

In accordance with the invention, upper and lower interconnectors 120 and 122, respectively, connect each carrier member 14 to the respective upper and lower roller chains 50 and 52 so as to cause each carrier member 14 to be easily moved with cyclic motion about the apparatus frame 30. Moreover, it is a feature of the invention that the carrier members 14 provided upon the apparatus 10 can be easily changed so as to accommodate can ends of differing size. To permit this easy interchanging or repositioning, each roller chain link interconnecting pin 56 is provided with this axial extension; thus, a carrier member 14 can be easily removed or assembled to any desired link point upon each chain. Further, the apparatus may be operated at full capacity, as shown in FIG. 3, or a number of carrier members 14 may be removed as needed. To this end, first and second extension blocks 124 and 126 are attached to each carrier member 14 at its upper and lower extremity, respectively. As explained above, the roller chains are provided with link pins 56 each of which has an extended axial dimension. These extender blocks 126 are provided with holes or other simple journals adapted to receive the extending portion of these pins 56 and thus attach the extension means and the carrier member 14 to the roller chains 50 and 52 for cooperative motion.

It is another feature of the invention that these carrier members 14 and any contained can end stacks 12 are moved about the apparatus 10 with relatively little effort and without undue strain being placed upon the roller chains 50 or 52 or other portions of the apparatus. To this end, a single roller 130 is journalled to the bottom 132 of each carrier member base plate 90 in a position to roll along or over a surface 136 of the frame tabletop 32. To provide maximum support for the carrier member 14 and carried stacked can end stack 12, the roller 130 is mounted substantially directly below the center of gravity of each carrier member 14. This arrangement causes the carrier member 14 to be moved about the apparatus frame 30 in a balanced manner with the carrier member and can end weights supported directly by the frame 30.

As illustrated more particularly in FIG. 5, the roller 130 is here mounted upon a base plate extension member 138. This base plate extension member 138 is, in turn, mounted directly below the base plate 90. To permit movement of the ejector bar 100 through the carrier member, and to insure that all the can ends are pushed into the transfer station 16, this base plate 90 is provided with a groove 140; the base plate extension member 138 protrudes substantially below this space through which the ejector bar 100 travels, thereby placing the roller 130 out of the way of ejector bar motion.

In accordance with yet another aspect of the invention, each carrier member 14 may be precisely positioned in or adjacent the ejector or transfer station 60. This carrier member positioning is accomplished by a sensor 150 mounted atop the frame 30 as illustrated in FIGS. 1 and 2. A feeler member (here, a retractile roller 152) is located so as to engage the upper extension member 124 and thus sense its presence or absence at a predetermined spot relative to the transfer station 16. This sensor 150 is connected to the roller chain drive motor 62 by electric circuitry or other appropriate means for halting motion of the drive motor 62 and interconnected roller chains 50 and 52 when the carrier member 14 is located in a correspondingly predetermined spot relative to the can end transfer station 16. Thus, as a carrier member 14 is moved into position, it is precisely halted in a location permitting easy and trouble-free ejectment of the can end stack 14 into the transfer station 16 by the ejector bar 100.

After the ejector bar 100 is retracted, appropriate circuitry between the sensor 150 and the sensors 110 and 112 permit further indexing motion of the chains 50 and 52 so as to bring another fully loaded carrier member 14 into the predesignated position opposite the transfer station 16. As the can ends are used within the processing machine (not shown) the stack within the transfer station 16 and intake structure 22 grows progressively shorter. When a minimal can end stack height is sensed, as by the sensor 110, appropriate circuitry activates the ejector cylinder 106, the ejector bar 110 forces another stack of can ends into the transfer station 16, and the machine operation cycle is repeated.

It should be kept in mind that the unit 10 shown in the drawings and hereinabove described, is illustrative of but one form or embodiment of the present invention, and it is envisioned that various changes in the structure, or alternate sequences of operation from those described, will no doubt occur to those skilled in the art; as such, said changes or modifications are to be understood as forming part of the present invention, insofar as they fall within the spirit and scope of the claims appended hereto.

I claim:

1. Apparatus for supplying can ends and the like, comprising a frame, endless upper and lower multi-link, roller drive chains mounted for cyclic motion on the frame, drive means for driving the upper and lower roller chains, a plurality of carrier members for supporting a stack of can ends or the like, carried by said roller chains, and ejector means for transferring a stack of ends from said carrier member to a receiving station, an improved mounting arrangement for said carrier members, comprising releasable interconnector means for connecting each carrier member to the upper and lower roller drive chains, which interconnector means includes first and second spaced extensions on each carrier member extending toward the respectively adjacent upper and lower roller chains, and vertically projecting pin means on said roller chains, said first and second extensions providing aperture means receiving said pin means to attach the carrier members to the roller chains for motion therewith, said interconnecting means enabling the positions of the carrier members on the chain to be altered and also providing for ease in the interchanging of carrier members of different size; and support means for said carrier members, comprising an upper, substantially planar frame surface, roller means journalled to the bottom of each carrier member in a position to roll over said frame surface to facilitate movement of said carrier member about the apparatus frame and to support the carrier members and any can ends carried therein so that the weight of said carrier members and can ends need not be supported by said drive structure or said interconnector means.

2. Apparatus according to claim 1 wherein each carrier member includes a grooved base plate, the groove permitting said ejector means to move through the carrier member and laterally eject all of the can ends in the can end stack from the carrier member, and said roller means being affixed to said base plate at a point remote from the space through which the ejector means travels.

3. Apparatus according to claim 1 wherein said roller means is substantially directly below the center of gravity of each carrier member to permit the carrier member to be moved about on the apparatus frame in a balanced manner.

4. Apparatus according to claim 1 including sensor means mounted on the frame, adapted to sense the presence or absence of a carrier member at a predetermined location relative to a can end transfer station, said sensor means being operatively connected to the roller chain drive means for halting motion of the roller chain and carrier members when a carrier member is located in a correspondingly predetermined location relative to the can end transfer station.

* * * * *

UNITED STATES PATENT AND TRADEMARK OFFICE
CERTIFICATE OF CORRECTION

PATENT NO. : 4,000,709
DATED : January 4, 1977
INVENTOR(S) : WALLACE W. MOJDEN

It is certified that error appears in the above-identified patent and that said Letters Patent are hereby corrected as shown below:

Column 5, line 6, before "substantially" insert --mounted--

Signed and Sealed this

Fifth Day of April 1977

[SEAL]

Attest:

RUTH C. MASON
*Attesting Officer*

C. MARSHALL DANN
*Commissioner of Patents and Trademarks*